US009822306B2

(12) United States Patent
Chiu et al.

(10) Patent No.: US 9,822,306 B2
(45) Date of Patent: Nov. 21, 2017

(54) LIQUID CRYSTAL POLYMER COMPOSITE FILM

(71) Applicant: INDUSTRIAL TECHNOLOGY RESEARCH INSTITUTE, Hsinchu (TW)

(72) Inventors: Mao-Yuan Chiu, Yuli Township, Hualien County (TW); Dan-Cheng Kong, Taibao (TW); Ang-Ta Tsai, Taichung (TW); Hung-Jen Liu, Hsinchu (TW); Min-Fei Tsai, Kaohsiung (TW); Li-Han Chung, Miaoli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/944,198

(22) Filed: Nov. 17, 2015

(65) Prior Publication Data

US 2016/0376504 A1  Dec. 29, 2016

(30) Foreign Application Priority Data

Jun. 25, 2015 (TW) .............................. 104120516 A

(51) Int. Cl.
*C09K 19/54* (2006.01)
*C09K 19/38* (2006.01)

(52) U.S. Cl.
CPC .......... *C09K 19/54* (2013.01); *C09K 19/3809* (2013.01)

(58) Field of Classification Search
CPC .................................................. B65D 65/02
See application file for complete search history.

(56) References Cited

U.S. PATENT DOCUMENTS

| | | | |
|---|---|---|---|
| 4,728,461 A * | 3/1988 | Fujii | C08G 65/485 252/511 |
| 4,966,807 A | 10/1990 | Harvey et al. | |
| 5,262,473 A | 11/1993 | Cottis et al. | |
| 5,288,529 A | 2/1994 | Harvey et al. | |
| 5,326,848 A | 7/1994 | Kashimura et al. | |
| 5,422,398 A | 6/1995 | Weiss | |
| 5,534,209 A | 7/1996 | Moriya | |
| 5,843,562 A | 12/1998 | Onodera et al. | |
| 5,997,765 A * | 12/1999 | Furuta | B65D 65/02 206/709 |
| 6,221,962 B1 | 4/2001 | Heino et al. | |
| 6,528,164 B1 | 3/2003 | Ohbe et al. | |
| 6,660,182 B2 | 12/2003 | Jester | |
| 7,101,597 B2 | 9/2006 | Wang et al. | |
| 7,160,499 B2 | 1/2007 | Miyata et al. | |
| 7,740,790 B2 | 6/2010 | Onodera et al. | |
| 2004/0044136 A1* | 3/2004 | Kim | C08J 3/005 525/192 |
| 2011/0003196 A1 | 1/2011 | Kim | |

FOREIGN PATENT DOCUMENTS

| | | |
|---|---|---|
| CN | 1167127 A | 12/1997 |
| CN | 103642017 A | 3/2014 |
| WO | WO-97/24403 A1 | 7/1997 |
| WO | WO-98/07533 A1 | 2/1998 |

OTHER PUBLICATIONS

Taiwanese Office Action dated Mar. 1, 2016.
W. Chinsirikul et al., "Liquid Crystalline Polymer (LCP) Reinforced Polyethylene Blend Blown Film: Effects of Counter-Rotating Die on Fiber Orientation and Film Properties", Nov. 1996.
Ruobing Yu et al., "Rheology and Relaxation Processes in a Melting Thermotropic Liquid-Crystalline Polymer", 2007.
Pijush K. Mandal et al., "Studies on the Engineering Properties of LCP-Vectra B 950/PP Blends with the Variations of EAA Content", 2011.
Richard W. Lusignea, "Orientation of LCP Blown Film With Rotating Dies", Dec. 1999.
Brian Farrell et al., "The Processing of Liquid Crystalline Polymer Printed Circuits", 2002.

* cited by examiner

*Primary Examiner* — Chanceity Robinson
(74) *Attorney, Agent, or Firm* — Rabin & Berdo, P.C.

(57) ABSTRACT

A liquid crystal polymer (LCP) composite film is provided. The LCP composite film includes 88 to 99 weight percent of a liquid crystal polymer based on the total weight of the LCP composite film and 1 to 12 weight percent of a toughening agent based on the total weight of the LCP composite film. The toughening agent includes a copolymer selected from a group consisting of a thermoplastic polyolefin elastomer, a glycidyl methacrylate copolymer, a polystyrene elastomer, a polyester elastomer, and a mixture thereof.

12 Claims, No Drawings

LIQUID CRYSTAL POLYMER COMPOSITE FILM

This application claims the benefit of Taiwan application Serial No. 104120516, filed Jun. 25, 2015, the subject matter of which is incorporated herein by reference.

TECHNICAL FIELD

The present disclosure relates in general to a liquid crystal polymer (LCP) composite film.

BACKGROUND

In recent years, along with the rapid growth of needs for high frequency transmission of space technology products, national defense technology products, and mobile communication products, circuit substrates having low dielectric constants and low dielectric dissipation factors have become one of the focuses of further technology developments, in order to comply with the needs for high frequency transmission. Liquid crystal polymers (LCP) have electrical properties that high frequency transmission requires, such as low moisture absorption, low dielectric constants, low dielectric dissipation factors, and etc., and characteristics of high heat resistance, high size stability, heat conduction, chemical resistance, flame retardant, thermal plasticity, recoverability, and etc., and thus have become the main stream of high frequency flexible substrates.

However, due to the high difficulty of current film-forming technology of liquid crystal polymers, the liquid crystal polymer films have severely insufficient mechanical properties along the transverse direction (TD), which become the main restriction of treatments and applications of flexible substrates. Therefore, it has become the key to the current progress of high frequency flexible substrate products to develop liquid crystal polymer films having excellent mechanical properties as well as high flexibility.

SUMMARY

According to an embodiment of the present disclosure, a liquid crystal polymer (LCP) composite film is provided. The LCP composite film includes 88 to 99 weight percent of a liquid crystal polymer based on the total weight of the LCP composite film and 1 to 12 weight percent of a toughening agent based on the total weight of the LCP composite film. The toughening agent includes a copolymer selected from a group consisting of a thermoplastic polyolefin elastomer, a glycidyl methacrylate copolymer, a polystyrene elastomer, a polyester elastomer, and a mixture thereof.

The following description is made with reference to the accompanying embodiments.

DETAILED DESCRIPTION

Details of embodiments of the present disclosure are described hereinafter. Specific compositions disclosed in the embodiments are for examples for explaining the disclosure only and are not to be construed as limitations. A person having ordinary skill in the art may modify or change corresponding compositions of the embodiments according to actual applications.

According to one embodiment of the present disclosure, a liquid crystal polymer (LCP) composite film is provided. The LCP composite film includes 88 to 99 weight percent of a liquid crystal polymer and 1 to 12 weight percent of a toughening agent based on the total weight of the LCP composite film, such that the LCP composite film can have a low dielectric constant, a low dielectric dissipation factor, and excellent mechanical properties. The toughening agent includes a copolymer, and the copolymer is selected from a group consisting of a thermoplastic polyolefin elastomer, a glycidyl methacrylate copolymer, a polystyrene elastomer, a polyester elastomer, and a mixture of any two or more of the above compounds. In other words, according to the embodiments of the present disclosure, the toughening agent may include two of more of the above copolymers. The polystyrene elastomer or the polyester elastomer each has a soft segment and a hard segment, and the hard segment has at least an aromatic ring.

In the LCP composite film applying liquid crystal polymers as the main component, the liquid crystal polymers tend to arrange along the machine direction (MD). According to the embodiments of the present disclosure, in addition to applying liquid crystal polymers as the main component, 1 to 12 weight percent of a toughening agent is further added. The toughening agent, for example, is mixed within the liquid crystal polymers for breaking the directional arrangements of the polymers, or forms chemical bonds with the liquid crystal polymers for breaking the directional arrangements of the polymers, such as by grafting branches on the liquid crystal polymers. Accordingly, the mechanical properties of the LCP composite film along the transverse direction (TD) can be effectively increased, such that the LCP composite film can have uniform chemical extensibility along the machine direction and the transverse direction, and hence the overall toughness of the LCP composite film is further improved.

Furthermore, according to the embodiments of the present disclosure, the LCP composite film has 88 weight percent or higher of the liquid crystal polymers, such that the LCP composite film can have physical properties, such as a low dielectric constant, a low dielectric dissipation factor, and etc., required for high frequency and high speed signal transmissions. For example, the LCP composite film has a dielectric constant of such as less than or equal to 2.9 and a dielectric dissipation factor of such as less than or equal to 0.0027 under an operation frequency of 10 GHz.

In addition, the manufacture of the LCP composite film merely requires adding a toughening agent to 88 weight percent or more of the liquid crystal polymers. Therefore, according to the embodiments of the present disclosure, the LCP composite film not only has uniform mechanical property and toughness but also is provided with advantages of simplifying the manufacturing process.

In an embodiment, the LCP composite film includes such as 3 to 10 weight percent of the toughening agent based on the total weight of the LCP composite film. In another embodiment, the LCP composite film includes preferably such as 3 to 7 weight percent of the toughening agent based on the total weight of the LCP composite film.

In the embodiment, the thermoplastic polyolefin elastomer may include such as an ethylene-α-olefin copolymer. The ethylene-α-olefin copolymer may include a random copolymer, a block copolymer, or the combination of both. The α-olefin in the ethylene-α-olefin copolymer may include propylene, butene, octene, or any combination of the above compounds. The thermoplastic polyolefin elastomer has a hardness of 10D-50D. In an embodiment, the LCP composite film includes such as 3 to 5 weight percent of the thermoplastic polyolefin elastomer based on the total weight of the LCP composite film.

In the embodiments, the glycidyl methacrylate copolymer may include an ethylene-glycidyl methacrylate terpolymer, an ethylene-acrylic ester-glycidyl methacrylate terpolymer, an ethylene-n-butyl acrylate-glycidyl methacrylate terpolymer, or any combination of the above compounds. The weight percentage of glycidyl methacrylate is in a range of 0.2-10% based on the total weight of the glycidyl methacrylate copolymer. In an embodiment, the LCP composite film includes 2.5 to 10 weight percent of the glycidyl methacrylate copolymer based on the total weight of the LCP composite film. In an embodiment, the LCP composite film includes 2.5 to 7 weight percent of the ethylene-glycidyl methacrylate copolymer based on the total weight of the LCP composite film. In an embodiment, the LCP composite film includes 5 to 10 weight percent of the ethylene-n-butyl acrylate-glycidyl methacrylate terpolymer based on the total weight of the LCP composite film. In an embodiment, the toughening agent includes at least the glycidyl methacrylate copolymer.

In the embodiments, the polystyrene elastomer includes such as a styrene-ethylene-butylene copolymer. The styrene-ethylene-butylene copolymer may include a diblock copolymer, a triblock copolymer, and/or a branched copolymer. In the polystyrene elastomer (styrene-ethylene-butylene copolymer), the polystyrene is a hard segment, the ethylene-butylene is a soft segment, and a weight ratio of the hard segment to the soft segment of the polystyrene elastomer (hard segment/soft segment) ranged from 13/87 to 75/25. In an embodiment, the LCP composite film includes such as 2 to 5 weight percent of the polystyrene elastomer based on the total weight of the LCP composite film.

In the embodiments, the polyester elastomer includes such as a polyether-ester block copolymer. In the polyester elastomer, the polyether is a soft segment, and the polyester is a hard segment. The polyester elastomer has a hardness of 25D to 85D and a vicat softening temperature of 70° C. to 210° C. In an embodiment, the LCP composite film includes such as about 5 weight percent of the polyester elastomer based on the total weight of the LCP composite film.

According to the embodiments of the present disclosure, the toughening agent is a polymer structure having toughness and flexibility, such as a polymer elastomer having a soft segment and a hard segment. The factor that influences the flexibility the most is the main chain molecular structure (soft segment/hard segment). In the embodiments of the present disclosure, the toughening agent may have a flexible soft segment/hard segment structure, and the molecular structure of the toughening agent is compatible with the liquid crystal polymers. That is, the toughening agent has an aromatic ring structure within the molecular chains, which have similar polarity to that of liquid crystal polymers and/or have reactive functional groups that can graft to liquid crystal polymers. As such, a block structure of the toughening agent, e.g. aromatic functional groups and/or reactive functional groups having similar polarity to that of liquid crystal polymers, can be mixed within the liquid crystal polymers, and another block structure of the toughening agent having soft segment molecular chains can effectively increase the flexibility as well as the toughness of the whole LCP composite film, such that the LCP composite film can have high toughness along the transverse direction.

In the embodiments, the liquid crystal polymer may include at least one of the following: a hydroxybenzoic acid-hydroxynaphthoic acid copolymer, a hydroxybenzoic acid-biphenol-terephthalic acid copolymer, and a hydroxybenzoic acid-ethylene glycol-terephthalic acid copolymer.

In an embodiment, in the hydroxybenzoic acid-hydroxynaphthoic acid copolymer, a molar ratio of hydroxybenzoic acid to hydroxynaphthoic acid (hydroxybenzoic acid/hydroxynaphthoic acid) ranges such as about from 80/20 to 60/40.

In the embodiments, the LCP composite film has a thickness of such as 15 to 250 µm. In other embodiments, the LCP composite film has a thickness of such as 25 to 200 µm.

In some embodiments, the manufacturing method of the LCP composite film includes such as the following steps.

The raw materials of the liquid crystal polymer and the toughening agent are separately flowed into a twin screw extruder and melted to be extruded out of a T shaped head. And then, the LCP composite film is obtained from a casting drum, and the thickness of the obtained LCP composite film may be 15 to 250 µm or 25 to 200 µm. The temperature of the twin screw extruder is 280° C. to 350° C., and the temperature of the casting drum is 15° C. to 40° C.

Alternatively, the raw materials of the liquid crystal polymer and the toughening agent are mixed uniformly and flowed into an extruder, and the raw material of a protection film is flowed into another extruder. And then, the mixed materials of the liquid crystal polymer and the toughening agent and the material of a protection film are extruded out of a T shaped head, forming a structure having top and bottom layers of protection films and an intervening layer of the LCP composite film. Such multilayer structure may have three or more layers, and the overall thickness may be 15 to 250 µm or 25 to 200 µm.

In addition, the LCP composite single-layered film or three-layered film may be formed by a T shaped head, and also may be formed by a ring shaped blown head, followed by treatments of wind circulation, herringbone racks, and clamp wheels for obtaining the LCP composite film.

Further explanation is provided with the following examples. Compositions and test results of properties of the LCP composite films of some embodiments are listed for showing the properties of the LCP composite films prepared according to the embodiments of the disclosure. However, the following examples are for purposes of describing particular embodiments only, and are not intended to be limiting. The compositions and the test results of properties of the LCP composite films of each of the embodiments are listed in table 1, wherein the ratios of each of the components are represented as the weight percentages with respect to the whole LCP composite film.

In table 1, LCP indicates the liquid crystal polymer (Celanese VECTRA® A950), wherein hydroxybenzoic acid-hydroxynaphthoic acid copolymer is used, and the molar ratio of hydroxybenzoic acid to hydroxynaphthoic acid is 73/27; SEBS (styrene-ethylene-butylene-styrene triblock copolymer) is a polystyrene elastomer (Kraton® G1645M), wherein the polystyrene elastomer contains 13 weight percent of polystyrene; TPEE is a polyester elastomer (DuPont Hytrel® 8238) having a hardness of 82D; POE is an ethylene-octene copolymer (Dow Engage™ 8003), wherein the ethylene-octene copolymer contains 18 mol % of octene and has a hardness of 31 D; PE-GMA is an ethylene-glycidyl methacrylate copolymer (Arkema LOTADER® AX8840), wherein the ethylene-glycidyl methacrylate copolymer contains 8 weight percent of glycidyl methacrylate; PE-nBA-GMA is an ethylene-n-butyl acrylate-glycidyl methacrylate terpolymer (DuPont Elvaloy® PTW), wherein the ethylene-n-butyl acrylate-glycidyl methacrylate terpolymer contains 0.4 weight percent of glycidyl methacrylate; LLDPE is a linear low-density polyethylene (Dow DOWLEX™ 2049 G) and has a density of 0.926 g/cm$^3$.

As shown in table 1, examples 1-12 and comparative examples 1-2 are LCP composite single-layered films made by melt extrusion by a T shaped head, and the thicknesses are all about 170 μm. The values of tensile strength at break along the transverse direction, elongation at break along the transverse direction, and toughness along the transverse direction of the samples of examples 1-12 and comparative examples 1-2 are all measured according to ASTM D882. The samples have a length of 5 cm and a width of 1 cm, and the stretching rate is 10 mm/min. The values of toughness as listed in table 1 are the work (kJ/m$^2$) when the samples are stretched at break.

TABLE 1

| | Component (wt %) | | Tensile strength at break (MPa) | Elongation at break (%) | Toughness (kJ/m$^2$) |
|---|---|---|---|---|---|
| | LCP | Toughening agent | | | |
| Example 1 | 97% | 3% SEBS | 47.9 | 6.38 | 69.3 |
| Example 2 | 95% | 5% SEBS | 43.6 | 7.83 | 78.5 |
| Example 3 | 95% | 5% TPEE | 38.5 | 5.93 | 45.2 |
| Example 4 | 93% | 5% TPEE + 2% SEBS | 44.0 | 5.53 | 47.3 |
| Example 5 | 95% | 5% POE | 28.2 | 4.0 | 19.2 |
| Example 6 | 95% | 2% SEBS + 3% POE | 39.8 | 7.67 | 61.5 |
| Example 7 | 93% | 7% PE-GMA | 55.3 | 46.0 | 657.4 |
| Example 8 | 95% | 2% SEBS + 3% PE-GMA | 55.5 | 23.4 | 153.9 |
| Example 9 | 95% | 5% PE-nBA-GMA | 55.6 | 28.8 | 390.2 |
| Example 10 | 90% | 10% PE-nBA-GMA | 47.5 | 23.9 | 255.3 |
| Example 11 | 90% | 5% PE-nBA-GMA + 5% SEBS | 47.5 | 37.5 | 436.3 |
| Example 12 | 90% | 5% PE-nBA-GMA + 2.5% SEBS + 2.5% PE-GMA Additives | 46.3 | 36.9 | 423.7 |
| Comparative example 1 | 100% | 0% | 21.4 | 1.87 | 3.4 |
| Comparative example 2 | 95% | 5% LLDPE | 15.5 | 1.73 | 4.7 |

As shown in table 1, compared to the LCP composite films of comparative examples 1-2, the tensile strength at break, the elongation at break, and the toughness of the LCP composite films of examples 1-12 have been greatly improved. As shown in table 1, the LCP composite films of examples have a tensile strength at break of greater than 28 MPa, an elongation at break of greater than 4%, and a toughness of greater than 19 kJ/m$^2$.

In summary, the LCP composite films of the present disclosure uses a liquid crystal polymer as the main components (the content of the liquid crystal polymer is equal to or higher than 88 weight percent) and introduces a suitable toughening agent. As such, by controlling the molecular structure, adjusting the soft segment and the hard segment of the block copolymer, and differencing the viscosity/flexibility of the material, the toughness of the LCP composite film can be increased, and the extension, the mechanical property, and the toughness along the transverse direction of the LCP composite film can be further improved.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal polymer (LCP) composite film, comprising:
   90 weight percent of a liquid crystal polymer based on the total weight of the LCP composite film; and
   10 weight percent of a toughening agent based on the total weight of the LCP composite film, wherein the toughening agent comprises a copolymer, and the copolymer comprises 5 to 7.5 weight percent of a glycidyl methacrylate copolymer and 2.5 to 5 weight percent of a polystyrene elastomer based on the total weight of the LCP composite film.

2. The LCP composite film according to claim 1, wherein the polystyrene elastomer comprises a styrene-ethylene-butylene copolymer, the styrene-ethylene-butylene copolymer comprises a diblock copolymer, a triblock copolymer, a branched copolymer, or any combination thereof.

3. The LCP composite film according to claim 2, wherein the polystyrene elastomer has a hard segment and a soft segment, and a weight ratio of the hard segment to the soft segment of the polystyrene elastomer ranges from 13/87 to 75/25.

4. The LCP composite film according to claim 1, wherein the toughening agent comprises two or more of copolymers.

5. The LCP composite film according to claim 1, wherein the liquid crystal polymer comprises at least one of a hydroxybenzoic acid-hydroxynaphthoic acid copolymer, a hydroxybenzoic acid-biphenol-terephthalic acid copolymer, and a hydroxybenzoic acid-ethylene glycol-terephthalic acid copolymer.

6. The LCP composite film according to claim 5, wherein a molar ratio of hydroxybenzoic acid to hydroxynaphthoic acid in the hydroxybenzoic acid-hydroxynaphthoic acid copolymer ranges from 80/20 to 60/40.

7. The LCP composite film according to claim 1, wherein the LCP composite film has a tensile strength at break of greater than 28 MPa, the LCP composite film has an elongation at break of greater than 4%, and the LCP composite film has a toughness of greater than 19 kJ/m2.

8. The LCP composite film according to claim 1, wherein the LCP composite film has a dielectric constant of less than or equal to 2.9 and a dielectric dissipation factor of less than or equal to 0.0027 under an operation frequency of 10 GHz.

9. The LCP composite film according to claim 1, wherein the glycidyl methacrylate copolymer comprises an ethylene-glycidyl methacrylate terpolymer, an ethylene-n-butyl acrylate-glycidyl methacrylate terpolymer, or a combination thereof.

10. The LCP composite film according to claim 1, wherein the glycidyl methacrylate copolymer comprises 5 weight percent of an ethylene-n-butyl acrylate-glycidyl methacrylate terpolymer based on the total weight of the LCP composite film.

11. The LCP composite film according to claim 10, wherein the glycidyl methacrylate copolymer comprises 2.5 weight percent of an ethylene-glycidyl methacrylate terpolymer based on the total weight of the LCP composite film.

12. The LCP composite film according to claim 10, wherein the polystyrene elastomer is styrene-ethylene-butylene-styrene triblock copolymer (SEBS).

* * * * *